Dec. 13, 1966  F. F. HINES  3,290,940
THERMAL MEASURING PROBE
Filed Dec. 27, 1963  2 Sheets-Sheet 1

INVENTOR.
FRANK F. HINES
BY
Russell, Chittick & Pfund
ATTORNEYS

Dec. 13, 1966  F. F. HINES  3,290,940
THERMAL MEASURING PROBE
Filed Dec. 27, 1963  2 Sheets-Sheet 2

INVENTOR.
FRANK F. HINES
BY
ATTORNEYS

3,290,940
THERMAL MEASURING PROBE
Frank F. Hines, Litchfield, N.H., assignor to RdF Corporation, Hudson, N.H., a corporation of Massachusetts
Filed Dec. 27, 1963, Ser. No. 333,866
16 Claims. (Cl. 73—341)

This invention relates to multi-element electrical temperature sensors and more particularly to a tip sensitive, resistance temperature measuring probe having a composite core of metals with dissimilar heat transfer characteristics.

Electrical temperature sensors or transducers are well known in the measurement art. Representative examples of electrical temperature transducers include such devices as thermocouples, thermopiles, resistance thermometers, and radiation pyrometers. Generally speaking, the electrical transducers produce an electrical output in response to the transfer of heat from or to the transducer depending upon the polarity of the temperature gradient. Heat transfer or flow can be accomplished by convection, radiation, conduction or a combination thereof depending upon the mode of operation of the electrical temperature transducer. For example, if the transducer is located some distance from the measured body, convection and/or radiation constitute the principal method of heat transfer. On the other hand, if the transducer is placed in contact with the surface of the measured body, conduction is the primary method of heat transfer.

In either case, the electrical output of the transducer normally consists of a voltage or current which varies in accordance with changes in the temperature of the body under measurement. With additional circuitry the output can be made to vary in phase and/or frequency if subsequent control circuits require a fluctuating phase and/or frequency in order to achieve the desired degree of accuracy. However, regardless of the particular electrical characteristics of the transducer output, it is important to note that while the electrical output varies in accordance with the temperature of the measured body, the output is a measure only of the temperature of the transducer and not the temperature of the body.

Ideally, the instantaneous transducer temperature should be equivalent to the temperature of the measured body. However, under normal measurement conditions when the temperature of the body is changing, the instantaneous transducer temperature and the body temperature are usually different because of an intervening thermal barrier between the transducer and the measured body. The thermal barrier or impedance introduces a temperature lag so that although the transducer temperature, and hence, transducer electrical output follows the changes in body temperature, at any given time the transducer temperature will correspond to the temperature of the measured body at a previous moment in time. The termal barrier temperature lag or error is a direct function of the temperature gradient in the thermal barrier i.e., the difference between body temperature and transducer temperature. Thus if the transducer remains in a constant temperature environment, such as a calibration bath or furnace, for a sufficient period of time it will assume the temperature of the environment thereby reducing the thermal barrier error to zero. However, practical temperature measurements are seldom, if ever, made in an ideal environment. Normally, temperature measurements are taken under non-ideal conditions of non-uniform and rapidly changing temperatures with heat flow to or from the measured body or environment and with little time for equilibrium conditions to be established. Under such conditions, the thermal barrier temperature gradient introduces an error which is unacceptable in many industrial temperature measurement applications.

Research efforts have been directed mainly at reducing the thermal barrier to minimize the temperature error caused by the barrier temperature gradient. In the case of "contact" type transducers the thickness of the bonding material was reduced to decrease the heat flow distance between the measurement surface and the transducer. Intimately-bonded resistance thermometers and direct-welded thermocouples were tried, but without complete success because the thickness of the thermal barrier could not be reduced to zero.

A second method of reducing the thermal barrier error was based on the thermal characteristics of the barrier material; specifically, the thermal conductivity and specific heat of the barrier material. By using a material which had a high thermal conductivity and a relatively low specific heat, the temperature response time of the transducer could be decreased with a concomitant reduction in temperature error. Ideally, the thermal lag error could be completely eliminated if the barrier material had an infinite heat conductivity in and a zero specific heat. Of course, such a material could not be obtained, and hence, any material which was used necessitated a trade-off between heat conductivity and specific heat characteristics.

These two methods left much to be desired both in technique and in the end result. Essentially, the main thrust of each method involved an attempt to reduce an inevitable error to a minimum value by controlling certain physical and thermal characteristics of the barrier material. However, error reduction was limited by the inherent thermal and physical characteristics of the barrier material; the ideal thermal material did not exist and the barrier could not be made infinitely thin.

Conceptually, both of these approaches failed to recognize and therefore accept the inevitability of the thermal barrier and the temperature error associated therewith. If an accurate temperature measurement system is to be achieved, the influence of the thermal barrier error upon the measured temperature must be completely eliminated. Although the inherent thermal barrier errors cannot be reduced to zero, the influence of these errors upon the measured temperature can be negated by utilizing the errors themselves to cancel out the effects of the thermal barrier.

Thermal barrier error cancellation can be achieved by employing two transducers having dissimilar total thermal transfer coefficients. The term "total thermal transfer coefficient" will be defined subsequently, but in general refers to those factors which influence the transducer's response to a thermal condition. If the ratio of the transducers' total thermal transfer coefficient is the inverse of the ratio of their thermoelectric response sensitivities, then the differential combination of the transducer errors will produce a zero error, that is, a complete cancellation of the thermal barrier errors.

The principle of thermal barrier error cancellation is not limited by the number of transducer units, the type of transducers or the method of heat transfer. It is therefore a general object of the present invention to provide a tip sensitive, composite core multi-element temperature resistance probe utilizing the thermal barrier error cancellation of principle.

It is a specific object of the invention to optimize the response time of the temperature probe.

It is still another object of the invention to minimize the total amount of heat required by the temperature resistance sensing probe.

It is a further object of the invention to provide a temperature sensing probe which fulfills the above-mentioned objects while at the same time maintaining the probe diameter at a minimum.

These and other objects of the invention will be apparent from the following written description and drawings, in which.

Figure 1:
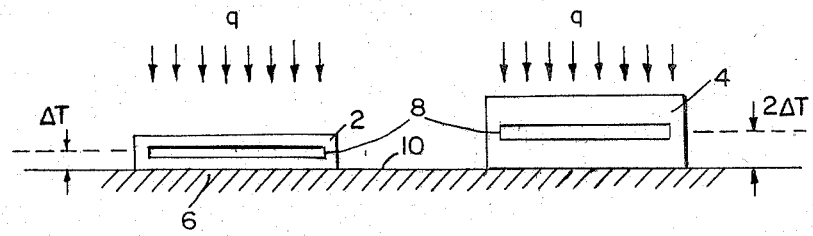
FIG. 1 is a simplified diagram showing in cross section two transducer units with their associated thermal impedances and corresponding temperature errors.

The general principle of thermal barrier error cancellation is illustrated in FIG. 1 wherein two temperature sensors 2 and 4 are presented to and in thermal contact with an object 6. The temperature sensors 2 and 4, hereinafter called the "primary" and "secondary" sensors respectively, have a transducer element 8 mounted therein to convert temperature into an electrical output having a characteristic which varies in accordance with changes in temperature. The particular type of transducer element is not important because the instrumentation of the thermal barrier error cancellation principle can be accomplished with any of the well-known transducer elements such as resistance wire thermometers and thermocouples.

Assuming for the purpose of illustration that the primary and secondary sensors 2 and 4 each have a thermocouple transducer element 8, then the output from the transducer will be an electro-motive force, the magnitude of which is a function of the temperature of the transducer element. The temperature of the transducer element 8 will vary from the true temperature of the object measurement surface 10 by an amount corresponding to the thermal gradient between the object surface and the transducer element. The thermal gradient occurs because the total thermal transfer coefficient between the measurement surface 10 and the transducer element 8 differs from unity. The term "total thermal transfer coefficient" is defined as including all factors which influence the ability of the transducer element 8 to respond instantaneously to a given temperature condition. Ideally the instantaneous temperature of the transducer element 8 should be identical to the true temperature of the measurement surface 10. However, as mentioned previously, this goal is impossible to obtain.

In the case of "contact" type transducers e.g., intimately bonded resistance thermometers and directly welded thermocouples, the total thermal transfer coefficient differs from unity primarily as the result of the intervening theremal impedance between the measurement surface and the transducer element because radiational and/or convectional heat losses have little if any influence upon the transfer coefficient for contact transducers. However, since radiational and/or convectional losses may strongly effect the transfer coefficient in some measurement situations, the term "total thermal transfer coefficient" will be employed although it should be understood that in the case of "contact" transducers the transfer coefficient is substantially affected only by the intervening thermal impedance.

Referring to FIG. 1 and assuming that the primary sensor 2 has a given thermal impedance between the transducer element 8 and the measurement surface 10 and further that a given quantity of heat energy $q$ impinges upon the sensor, then the instantaneous temperature of the transducer element 8 will be higher than the surface temperature of the object 6 due to the intervening thermal impedance. If the instantaneous object surface temperature is T, then the temperature of the transducer element will be $T+\Delta T$ where $\Delta T$ represents the error in degrees.

Now consider the secondary sensor 4 which has by design a thermal impedance two times greater than the thermal impedance of primary sensor 2. It is apparent that the temperature of the secondary sensor transducer element 8 will be $T+2\Delta T$. If $e$ represents the correct electrical corresponding to the true surface temperature T, then the actual output from the secondary sensor will be $e+2\Delta e$. Assuming that the transducer element of the primary sensor 2 has twice the thermoelectric response sensitivity of the secondary sensor transducer element, then the electrical output from the primary sensor 2 will be $2e+2\Delta e$. If the outputs are combined differentially, the result is $e$ where $2e+2\Delta e-e-2\Delta e=e$. Since $e$ represents the correct electrical output for the true temperature T, it can be seen that the errors introduced by the thermal impedances between the sensors and the measurement surface have been effectively cancelled.

The relationship between the total thermal transfer coefficient and the thermoelectric response sensitivity of the transducer element can be expressed as one in which the thermoelectric response sensitivites of the respective sensors are related in the inverse ratio of their total thermal transfer coefficients. Thus, if the primary sensor 2 had twice the thermal impedance of the secondary sensor 4, the thermoelectric response sensitivity of the secondary sensor 4 would have to be twice that of the primary sensor 2.

Figure 2:
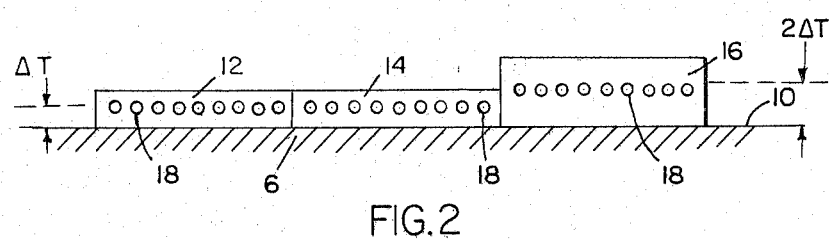
FIG. 2 is a simplified diagram in cross section showing a multi-element transducer assembly adapted for use in a four arm direct-reading galvanometer type bridge circuit.
Figure 3:
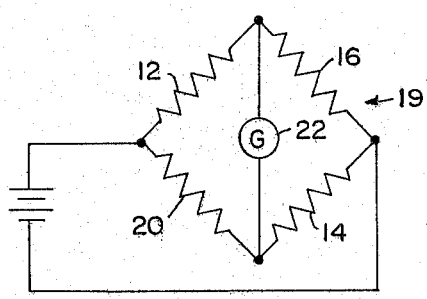
FIG. 3 is a schematic diagram of such a bridge circuit.

Although it was assumed in the above discussion that the primary and secondary transducer elements consisted of thermocouples, other types of tranducer elements can also be employed to instrument the thermal barrier error cancellation principle. For example, the instrumentation of this principle with resistance type thermometers is depicted in FIGS. 2 and 3 wherein resistance sensors 12, 14 and 16 are presented to and in thermal contact with the measurement surface 10 of object 6. Each sensor has a resistance wire grid 18, the resistance of which varies in accordance with changes in temperature. Sensors 12 and 14 each have a given and identical thermal impedance between the resistance wire grid 18 and the measurement surface 10. These sensors correspond to the primary sensor 2 in the above discussion and, hence, will also be termed "primary" sensors. Sensor 16 i.e., the "secondary" sensor in this particular configuration, is designed to have twice the thermal impedance of one of the primary sensors 12 or 14.

Now if the instantaneous object surface temperature is T, then the temperature of the resistance wire grid 18 of primary sensor 12 will be $T+\Delta T$ where $\Delta T$ represents the error in degrees. Since primary sensor 14 has the same thermal impedance as primary sensor 12, it follows that the temperature of the resistance wire grid 18 of sensor 14 will be $T+\Delta T$. If R represents the correct sensor resistance corresponding to the true surface temperature T, then the actual sensor resistance of the primary sensors 12 and 14 will be $R+\Delta R$ where $\Delta R$ in ohms corresponds to $\Delta T$ in degrees. Since the secondary sensor 16 has twice the thermal impedance of the primary sensors, the temperature of the resistance wire grid 18 of the secondary sensor 16 will be $T+2\Delta T$ which can be expressed in terms of resistance as $R+2\Delta R$.

Referring to FIG. 3, sensors 12, 14 and 16 are connected to form three arms of a bridge circuit indicated generally as 19. The fourth arm of bridge circuit 19 consists of a fixed resistor 20 having a zero temperature coefficient i.e., its resistance is independent of temperature. The bridge circuit 19 combines the resistances of sensors 12, 14 and 16 so that the voltage across, and hence, current through galvanometer 22 is proportional to the resistance of sensor 12 plus the resistance of sensor 14 minus the resistance of sensor 16. The current through galvanometer 22 will thus be a function of $$(R+\Delta R)+(R+\Delta R)-(R+2\Delta R)$$
$$R+\Delta R+R+\Delta R-R-2\Delta R=R$$

Since R is defined as the resistance of a single sensor at temperature T, the true temperature of the surface, the current through galvanometer 22 is a function of the true surface temperature T, and the thermal barrier errors have been effectively cancelled.

Figure 4:
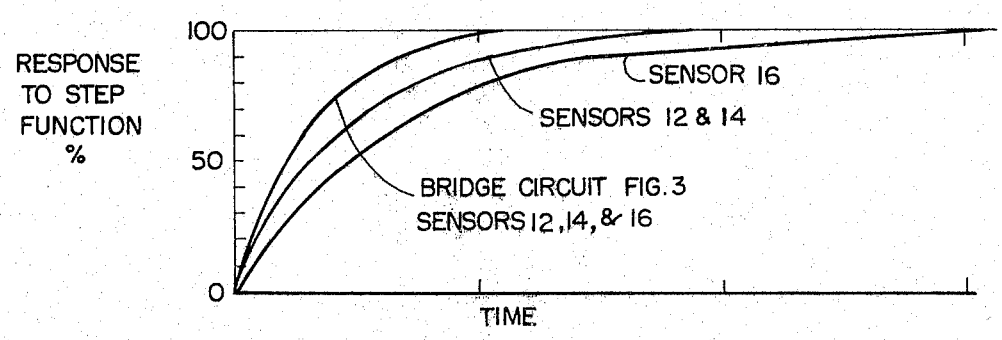
FIG. 4 is a graph illustrating the comparative response times of two individual sensors and the response time of the same two sensors connected to utilize the thermal barrier error cancellation principle.

The thermal barrier error cancellation principle also provides an increase in the apparent response time of the sensor unit over that of conventional sensors. If T is varying rapidly, the sensor configuration shown in FIG. 3 can follow the temperature changes faster than a single-element sensor because it effectively measures the temperature on the other side of the response slowing thermal barrier. This is shown graphically in FIG. 4 in which the surface of the object is subjected to an instantaneous temperature transient. The curves represent the response of the individual sensors 12 and 14 plus 16 and the combination thereof shown in FIG. 3 plotted against time. The curves depict a particular ratio of sensor resistance and thermal barriers. However, since these ratios can be varied to provide optimum performance in solving a particular measurement problem, it will be recognized that FIG. 4 is merely illustrative of one specific set of response characteristics.

Figure 5:
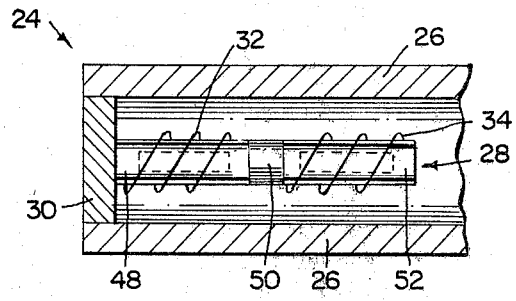
FIG. 5 is a view in cross section showing a tip sensitive, composite core temperature resistance probe adapted for use in a space restricted environment.

FIG. 5 depicts a temperature probe 24 of the temperature resistance wire type having a sheath 26, a core structure 28, a heat sensitive tip plate 30 and resistance wire windings 32 and 34. Assuming that the measurement environment dictates that probe 24 must have a minimum diameter, then the probe of necessity must be constructed with a single core. If a solid silver bar is used for the single core, the core must have a given length depending upon the thermal characteristics of the core material to provide the necessary thermal impedance i.e., the delay between the sensors required for a circuit configuration utilizing the thermal barrier error cancellation principle.

Figure 6:
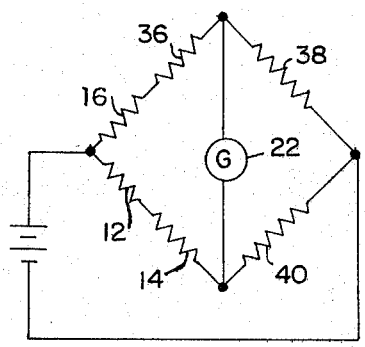
FIG. 6 is a schematic diagram of an alternative direct-reading galvanometer type bridge circuit for a multi-element transducer assembly.

The single core resistance wire windings 32 and 34 correspond respectively to the transducer elements of the primary and secondary sensors 2 and 4 and, hence, will be called hereinafter primary and secondary sensor windings. The composite core primary and secondary resistance windings can be instrumented in a variety of ways depending upon the configuration of the primary sensor. The primary sensor can be divided to form either two arms of a four arm bridge circuit e.g., FIG. 3 wherein split primary sensors 12 and 14 correspond to the divided primary winding 32 or a single series connected bridge arm as shown in FIG. 6. In the latter case, the secondary sensor 16 and a series connected zero temperature coefficient fixed resistor 36 to form the second bridge arm while similar zero temperature coefficient fixed resistors 38 and 40 complete the bridge circuit.

Figure 7:
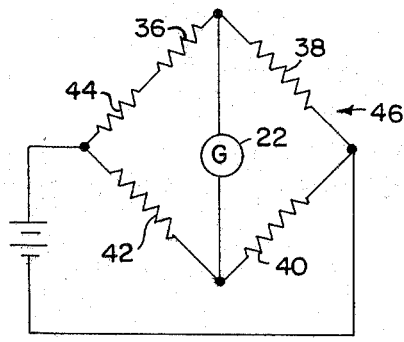
FIG. 7 is a schematic diagram of a tip sensitive, composite core temperature resistance probe connected in a direct-reading galvanometer type bridge circuit.

If sensors 12, 14 and 16 are connected in accordance with the FIG. 6 bridge circuit, the primary sensors 12 and 14 can be combined into a single sensor 42 as shown in FIG. 7. Resistors 42 and 44 represent respectively the primary and secondary resistance wire windings of probe 24. In other words bridge circuit 46 instruments both the primary and secondary sensors 2 and 4 and the primary and secondary resistance windings 32 and 34 of the two element composite core temperature probe 24. However, it should be understood that other well known bridge circuits can also be employed to instrument the probe without sacrificing the advantages of my composite core construction.

The temperature measurement advantage obtained from the composite core probe can best be understood by referring again to FIG. 5. If the core structure 28 consists of a solid silver bar, the response time of the probe unit 24 can be increased, but only slightly, by placing the primary resistance wire winding 32 closer to the heat sensitive tip plate 30. However, the response time of the probe can be increased significantly by reducing the heat sink effect of core 28. The heat sink effect can be reduced by using a relatively short central core 28. The short core markedly improves the individual response of primary sensor winding 32 because less total heat is required to pass into the core for a given use in temperature. Furthermore, since the thermal barrier error cancellation principle improves the apparent response time of the primary sensor, it is desirable to have the fastest possible response time in the primary sensor. In other words, the core should be as short as possible. However, the error cancellation principle also requires a secondary sensor which has a time lag response i.e., a larger thermal impedance than the primary sensor. The time lag, as mentioned previously, is obtained by employing a relatively long core.

Thus there are two conflicting requirements for the heat transmission medium assumed in previous discussion i.e., the solid silver core. Ideally, the primary sensor core should be constructed of a material with the highest possible thermal conductivity and the lowest possible thermal capacity. If the perfect material were available, one with infinite thermal conductivity and zero specific heat, there would be no advantage or need for thermal barrier error cancellation. However, in the practical case the secondary sensor in a thermal barrier error cancellation system requires a time lag which is provided by a transmission material having a limited thermal conductivity and a finite thermal capacity.

If a single core, tip sensitive, temperature resistance probe is desired, it is apparent that no single material will best meet the heat transmission requirements of the primary and secondary sensors. The objective of a fast primary sensor response time coupled with the time lag required for the secondary sensor can be achieved in a single core probe by employing a composite core of metals having dissimilar thermal characteristics. Thus as shown in FIG. 5, the core structure 28 is divided into three separate portions: a primary core 48 for the primary sensor winding 32; an intermediate core 50; and, a secondary core 52 for the secondary sensor winding 34. Ideally, the primary core 48 should have an infinite thermal conductivity and a zero specific heat since the time lag of a heat sink is not needed for the primary sensor winding 32 and is, in fact, not wanted. The heat sink effect of the primary core 48 can be reduced by making the core as short as possible consistent with the winding techniques for the primary winding 32. It should be noted that the dimensions of the primary and secondary cores in FIG. 5 have been made approximately equal for purposes of clarity and that no attempt has been made to accurately portray the winding pattern of the primary and secondary sensors because many well known windings are suitable.

In contrast to the desired fast response time of the primary sensor winding 32, the secondary sensor winding 34 must have a predetermined time lag in order to utilize the thermal barrier error cancellation principle. The requisite time delay is achieved by employing an intermediate core 50 between the primary and secondary cores 48 and 52, respectively. Ideally the intermediate core 50 should be constructed from a material which has a relatively low or moderate thermal conductivity and a zero specific heat. Similarly, the ideal material for the secondary core 52 would be a material which has an infinite thermal conductivity and a normal or moderate specific heat.

Obviously, the ideal materials for the primary, intermediate and secondary cores are not available, and therefore, materials must be selected which only approximate the thermal characteristics of the ideal materials. I have found that a comparison of the diffusivities is the best method for selecting suitable materials for the composite core temperature probe. Any two materials which have a ratio of thermal diffusivities of 2:1 or higher will produce a significant improvement in the thermal response characteristics of the temperature probe. However, it is desirable to have as high a ratio of thermal diffusivities as possible. For example, silver and stainless steel with a diffusivity ratio of approximately 30:1 provide a practical and effective combination of materials for the composite core temperature probe. Although silver and stainless steel have been chosen for the composite core structure 28, this particular combination of metals is merely illustrative and it is obvious that other combinations of materials can be selected which will have the desired ratio of thermal diffusivities.

Figure 8:
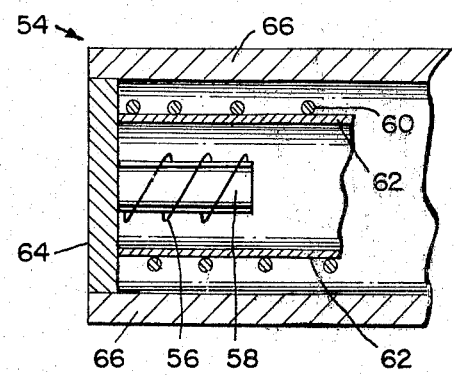
FIG. 8 is an alternative embodiment of a tip sensitive, multiple core temperature resistance probe adapted for use under conditions where probe diameter is not a premium.

The principles of the composite core structure described above can also be applied to probe constructions which are not limited by the factor of probe diameter. FIG. 8 depicts in cross section a multiple core temperature probe 54 constructed in accordance with the principles of the composite core structure. The relative diameters of the multiple core probe 54 and single core probe 24 can be seen by comparing FIGS. 5 and 8. Although the probe diameters are different, the components of the two probes are essentially the same. Thus the multiple core probe 54 has a primary sensor winding 56 wound on a primary core 58, a secondary sensor winding and core 60 and 62, respectively, a tip plate 64 and sheath 66. However, the two probes do not have identical structures. Referring to FIGS. 5 and 8, it can be seen that the major distinction between probes 24 and 54 lies in the construction and placement of the primary and secondary cores. The primary and secondary cores 58 and 62, respectively, of multiple core probe 54 are separate cores which are individually secured to and in thermally conductive contact with the tip plate 64. Temperature probe 24, on the other hand, has a single core with only the primary core 48 secured to and in thermal contact with tip plate 30. It should be noted that the multiple core configuration of probe 54 provides an independent heat transfer path for both the primary and secondary cores unlike the single core probe 24 which establishes a common heat path through the primary core 48, intermediate core 50 and secondary core 52.

The separate heat transfer paths of the multiple core probe 54 provide two advantages over the single core probe 24 albeit at a sacrifice in minimum probe diameter. First, the multiple core primary sensor winding 56 has an inherently faster response than the single core primary sensor winding 32 because unlike core 48, the primary core 56 does not have a heat sink behind it. Secondly, since the multiple core probe 54 has individual heat transfer paths for both the primary and secondary sensors, the response times of both sensors can be chosen independently of each other through the proper selection of core materials for the primary and secondary cores 58 and 62 respectively. The selection of core materials for the multiple core probe 54 follow the same general criteria as the selection of core materials for the single composite core probe 24 because the response of the multiple core secondary sensor 60 must be delayed with respect to the primary sensor 56 in order to utilize the thermal barrier error cancellation principle. I have found that the same approximate ratio of thermal diffusivities can be used for the multiple core materials i.e., a 2:1 ratio between the thermal diffusivities of the primary and secondary cores.

It should also be noted that since the response times of the primary and secondary sensors of the multiple core probe 54 are independent of each other the relative position of the primary and secondary cores as shown in FIG. 8 can, of course, be reversed. Other modifications of both probes readily suggest themselves, as for example, the elimination of the tip plates and sheaths. The tip plates and sheaths are provided to protect the cores and sensor windings from environmental damage such as would occur in measuring the temperature of a corrosive liquid or gas. However, if the body or fluid being measured has no deleterious effect upon the temperature probe, the sheath and tip plate can be eliminated and the probe placed in direct contact with either the body or fluid. It should be understood that if the tip plate and sheath are removed the entire probe is not placed in direct contact with the body or immersed in the fluid. Instead, only the portion of the primary core 48 which was originally in contact with the tip plate 30 is presented to the measurement surface. Similarly in probe 54, only the end portions or the primary and secondary cores 52 and 62, respectively, are placed in direct contact with the body or fluid. If the tip plate and sheath utilized in the two embodiments of the composite core probe described above are removed, it is obvious that other supporting structures can be employed to properly position the cores relatives to the measured body or fluid without interfering with the temperature measurement.

Numerous other modifications of my composite core temperature probes will also be apparent now to those skilled in the art, and therefore, I do not intend to confine my invention to precise form shown herein, but rather to limit its scope to the appended claims.

Having thus described and disclosed the preferred embodiments of my invention, what I claim as new and desire to secure by Letters Patent of the United States is:

1. A tip sensitive temperature probe comprising: a composite core having a first end portion, an intermediate portion and a second end portion, each of said end portions having a thermal diffusivity at least two times greater than the thermal diffusivity of said intermediate portion; a primary temperature sensitive means secured to said first end portion and a secondary temperature sensitive means secured to said second end portion, said primary and secondary temperature sensitive means having electrical response sensitivities to temperature the ratio of which is substantially the inverse of the ratio of the total thermal transfer coefficient of said first end portion to that of the whole core.

2. The apparatus defined in claim 1 wherein said primary and secondary temperature sensitive means comprise resistance wire windings.

3. The apparatus defined in claim 1 wherein said primary and secondary temperature sensitive means comprise thermocouples.

4. A tip sensitive temperature resistance probe comprising: a tip plate; a sheath secured to said tip plate; a composite core having a first end portion in thermally conductive contact with said tip plate, an intermediate portion and a second end portion, each of said end portions having a thermal diffusivity at least two times greater than the thermal diffusivity of said intermediate portion; and primary and secondary resistance wire windings secured respectively to said first and second end portions, said primary and secondary resistance wire windings having electrical response sensitivities to temperature the ratio of which is substantially the inverse of the ratio of the total thermal transfer coefficient of said first end portion to that of the whole core.

5. Thermal measuring apparatus comprising: a composite core having a first end portion, an intermediate portion and a second end portion, each of said end portions having a thermal diffusivity at least two times greater than the thermal diffusivity of said intermediate portion; primary and secondary temperature sensitive means secured respectively to said first and second end portions, said primary and secondary temperature sensitive means having electrical response sensitivities to temperature the ratio of which is substantially the inverse of the ratio of the total thermal transfer coefficient of said first end portion to that of the whole core; and electrical means connected to said primary and secondary temperature sensitive means for detecting the difference of the responses thereof.

6. The apparatus defined in claim 5 wherein said primary and secondary temperature means comprise thermocouples.

7. Thermal measuring apparatus comprising: a composite core having a first end portion, an intermediate portion and a second end portion, each of said end portions having a thermal diffusivity at least two times greater than the thermal diffusivity of said intermediate portion; primary and secondary resistance wire windings secured respectively to said first and second end portions, said primary and secondary resistance wire windings having electrical response sensitivities to temperature the ratio of which is substantially the inverse of the ratio of the total thermal transfer coefficient of said first end portion to that of the whole core; and electrical means connected to said primary and secondary resistance wire windings for detecting the difference of the responses thereof.

8. The apparatus defined in claim 7 wherein said electrical means comprises a bridge circuit having four arms, said first arm comprising said secondary resistance winding and a zero temperature coefficient fixed resistor, said second arm comprising a zero temperature coefficient fixed resistor, said third arm comprising said primary resistance winding, and said fourth arm comprising a zero temperature coefficient fixed resistor.

9. The apparatus defined in claim 7 wherein said electrical means comprises a bridge circuit having four arms, with said secondary resistance winding included in one arm, said primary resistance winding included partly in a second arm and partly in a third arm and a fixed zero temperature coefficient resistance included in said fourth arm of the bridge circuit.

10. A tip sensitive temperature probe comprising: primary and secondary cores having thermal diffusivities the ratio of which is at least 2:1; primary and secondary temperature sensitive means secured respectively to said primary and secondary cores, said primary and secondary temperature sensitive means having electrical response sensitivities to temperature the ratio of which is substantially the inverse of the ratio of the total thermal transfer coefficients of said primary and secondary cores.

11. The apparatus defined in claim 10 wherein said primary and secondary temperature sensitive means comprise thermocouples.

12. The apparatus defined in claim 10 wherein said primary and secondary temperature sensitive means comprise resistance wire windings.

13. A tip sensitive temperature probe comprising: primary and secondary cores having thermal diffusivities the ratio of which is at least 2:1; primary and secondary temperature sensitive means secured respectively to said primary and secondary cores, said primary and secondary temperature sensitive means having electrical response sensitivities to temperature the ratio of which is substantially the inverse of the ratio of the total thermal transfer coefficients of said primary and secondary cores; and electrical means connected to said primary and secondary temperature sensitive means for detecting the difference of the responses thereof.

14. A tip sensitive temperature probe comprising: primary and secondary cores having thermal diffusivities the ratio of which is at least 2:1; primary and secondary resistance wire windings secured respectively to said primary and secondary cores, said primary and secondary resistance windings having electrical response sensitivities to temperature the ratio of which is substantially the inverse of the ratio of the total thermal transfer coefficients of said primary and secondary cores; and electrical means connected to said primary and secondary resistance wire windings for detecting the difference of the responses thereof.

15. The apparatus defined in claim 14 wherein said electrical means comprises a bridge circuit having four arms, said first arm comprising said secondary resistance winding and a zero temperature coefficient fixed resistor, said second arm comprising a zero temperature coefficient fixed resistor, said third arm comprising said primary resistance winding, and said fourth arm comprising a zero temperature coefficient fixed resistor.

16. The apparatus defined in claim 14 wherein said electrical means comprises a bridge circuit having four arms, with said secondary resistance winding included in one arm, said primary resistance winding included partly in a second arm and partly in a third arm and a fixed zero temperature coefficient resistance included in said fourth arm of the bridge circuit.

References Cited by the Examiner

UNITED STATES PATENTS

| 2,798,377 | 7/1957 | Brownlee et al. | 73—340 |
| 3,233,458 | 2/1966 | Vrolyk | 73—340 |

LOUIS R. PRINCE, *Primary Examiner.*

STEVEN H. BAZERMAN, *Assistant Examiner.*